J. M. WESTCOTT & J. L. HALTEMAN.
Seeding Machine.
No. 201,578. Patented March 19, 1878.
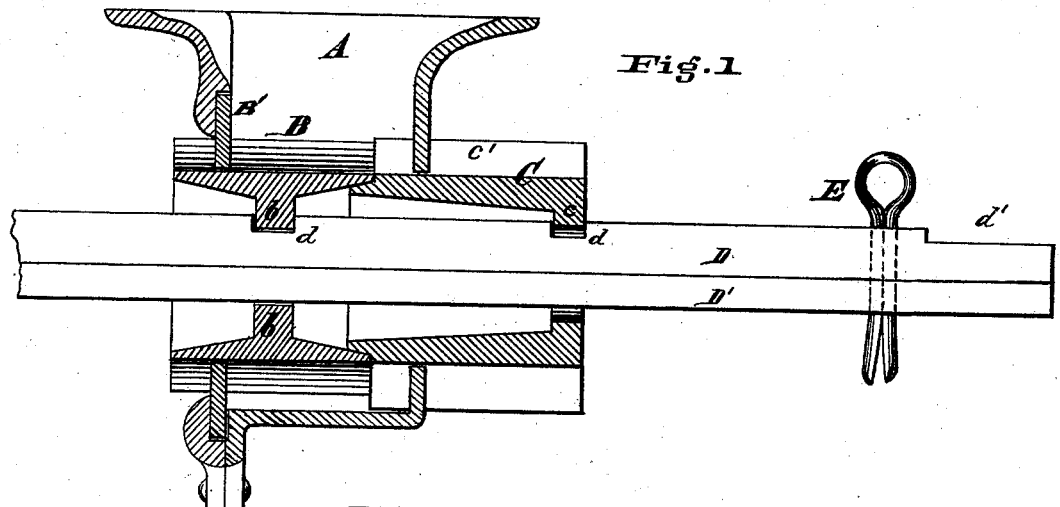
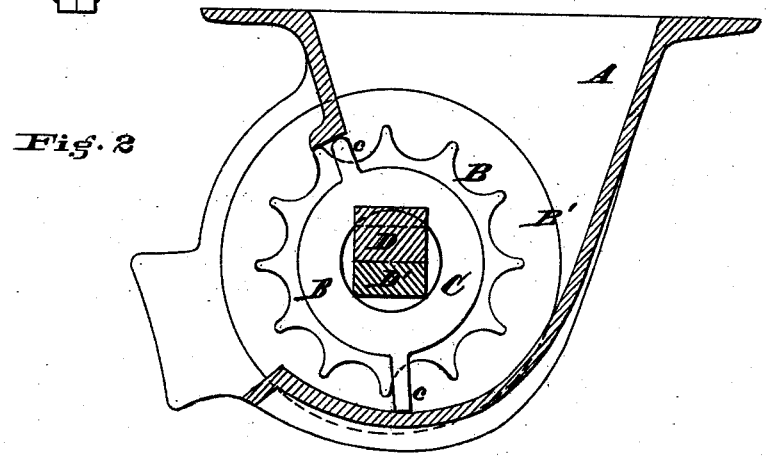
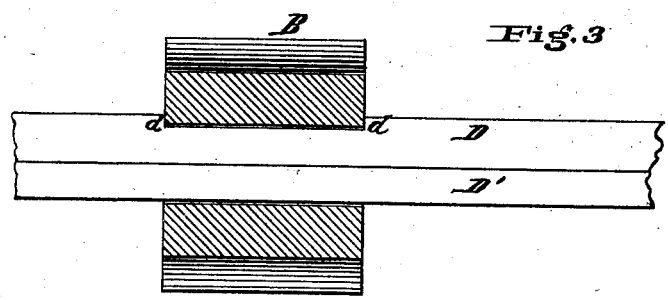

UNITED STATES PATENT OFFICE.

JOHN M. WESTCOTT AND JACOB L. HALTEMAN, OF MILTON, INDIANA, ASSIGNORS TO THE HOOSIER DRILL COMPANY, OF SAME PLACE.

IMPROVEMENT IN SEEDING-MACHINES.

Specification forming part of Letters Patent No. 201,578, dated March 19, 1878; application filed February 9, 1878.

*To all whom it may concern:*

Be it known that we, JOHN M. WESTCOTT and JACOB L. HALTEMAN, both of Milton, Wayne county, State of Indiana, have invented an Improvement in Seeding-Machines, of which the following is a specification:

Our invention relates to the class of seed-drills in which a series of seed-wheels are adjusted longitudinally in their cups to regulate the amount of seed delivered from each by the longitudinal or endwise movement of the shaft which rotates them; and our object is to dispense with the inserted detachable pins in the shaft now used to confine the wheel to its proper position on the shaft.

Our invention consists of a longitudinally-divided driving-shaft, one part of which is notched crosswise at equal intervals to receive corresponding projections from the interiors of the wheels, for the purpose of confining the wheels to their proper relative positions on the shaft.

Our invention further consists in making one part of the divided shaft of greater area in cross-section originally than the other, so that when the notches are cut in the former its area at the weakest part shall equal the area of the latter.

In the accompanying drawings, Figure 1 is a longitudinal section, showing a wheel and cut-off sleeve secured by our divided and notched shaft device. Fig. 2 is a cross-section of the seed-cup and end view of the sleeve and wheel therein. Fig. 3 is a slight modification, in which the notch $d$ extends the full width of the wheel.

A is the seed-cup; B, the revolving corrugated or toothed feed-wheel; B', its revolving corrugated washer, and C the winged sliding cut-off sleeve, which moves with the wheel, and prevents any escape of seed from the cup except through the space under the teeth of the wheel.

This is the way our seed-regulating devices are constructed; but our invention is equally applicable to seed-wheels which have no accompanying sleeves.

The seed-wheel has an interior rib or collar, $b$, at any point in its length; or there may be a rib or collar at each end. This rib or collar has a square hole through it to provide for its rotation by the shaft, and the sleeve has a similar rib or collar, $c$, with a round hole to provide against rotation by the shaft. The sleeve, as usual, is kept from displacement under the motion of the shaft within it by the seed cut-off wings $c'$, which slide through notches in the case.

The shaft has two parts, D D'. The part D is inserted through the wheels first, and is notched at $d$ to fit over the collars $b$, and the collars $c$, if sleeves are used. After the part D is in position, the part D' is pushed into place, and completes the driving-shaft. When both parts are in place, the key E is inserted to prevent end displacement.

By reason of the provision of the notches, the shaft is enabled to adjust the wheels to regulate the amount of seed delivered to the acre at the same time that it rotates them to cause the delivery.

I prefer to make the part D thicker, as shown, than the part D', to an extent equal to the depth of the notches to be cut, so that its sectional area through the notches shall be equal to the sectional area of the part D'. The driving end $d'$ is shouldered down in the thick part to fit a square hole in the driving-wheel.

We claim—

1. A seed-drill having a seed-wheel driving-shaft divided longitudinally, one part being notched or recessed at each wheel to fit corresponding projections from the interior of the wheel and its accompanying cut-off sleeve, or either of them, so that a series of wheels may be connected to the shaft for longitudinal adjustment with the shaft without the use of any other fastening than the shaft itself, substantially as and for the purpose specified.

2. The driving-shaft D D', divided longitudinally, one half being of greater sectional area than the other, to provide for the formation of notches for the wheels without rendering the area of the sections unequal at the weakest point, substantially as and for the purpose specified.

In testimony of which invention we hereunto set our hands.

JOHN M. WESTCOTT.
JACOB L. HALTEMAN.

Witnesses:
JOHN E. JONES,
J. L. WARTMANN.